Patented June 19, 1928.

1,674,558

UNITED STATES PATENT OFFICE.

ERNEST BALDWIN MILLER, OF BALTIMORE, MARYLAND, ASSIGNOR TO THE SILICA GEL CORPORATION, OF BALTIMORE, MARYLAND, A CORPORATION OF MARYLAND.

METHOD OF DRYING HYDROGELS.

No Drawing.     Application filed October 17, 1925. Serial No. 63,146.

This invention relates to a method of drying hydrogels.

In the manufacture of hard, porous silica gel or other gels of a similar nature, such as gels of oxides of tin, aluminum, tungsten or titanium, an intermediate product is formed which consists of a jelly-like mass containing a large amount of water, and this intermediate product is called hydrogel. The principal feature of this invention is an improved method of removing most of the water from this hydrogel, whereby the time required for this dehydrating may be considerably shortened, the cost of the operation reduced, and the output of the plant increased.

The gel should have a large number of ultramicroscopic pores in order that it may act as an efficient adsorbing agent to adsorb gases, vapors, or dissolved matter, as may be desired. As an example of the pore characteristics of properly manufactured silica gel, one gram has a total internal volume of about 0.41 cc. In other words, if we completely fill the pores in silica gel with water, the amount of water taken up will be approximately 41% of the initial weight of the gel. Furthermore, a sufficient percentage of the total internal volume of silica gel is made up of pores of such small size that the gel will adsorb water to such an extent that it will contain, at 30° C. at least 21% of its own weight of water when in equilibrium with water vapor at a partial pressure of substantially 22 mm. of mercury.

Several methods of preparing a hydrogel which when dried according to the method herein disclosed will yield a satisfactory product, are known. For example, a silica hydrogel may be made by Graham's method, which consists in adding sodium silicate solution to an acid solution in such quantities and concentrations that there is a large excess of acid in the mixture. This mixture is then dialyzed, whereupon after many hours the mixture in the membrane sets to a hydrogel. This hydrogel when dried as disclosed herein gives a satisfactory product. This method of producing the hydrogel is not commercially practicable, however, for the reason that the time required for setting is so great and the step of dialysis entails considerable loss of material.

I prefer to employ the method disclosed in the patent to Walter A. Patrick, No. 1,297,724, dated March 18, 1919, wherein solutions of a soluble silicate and an acid are mixed in definite quantities and concentrations, so that the mixture will set to a hydrogel within a few hours, for example, three to five. If equal volumes of sodium silicate and hydrochloric acid solutions are to be mixed, the sodium silicate solution should have a specific gravity of from 1.15 to 1.22, preferably about 1.185, and the hydrochloric acid should be about a ten per cent solution by weight, having a specific gravity of about 1.05. The commercial water glass used has a specific gravity of about 42° Bé. and contains about 9% $Na_2O$ and about 29 to 30% $SiO_2$. This is diluted to give a solution having the specific gravity specified above. When the solutions of these concentrations are mixed in equal volumes, with vigorous stirring, a clear, colloidal solution of silicic acid is first formed and no precipitation takes place, but after some time the entire solution gradually sets to a jelly-like mass of hydrogel. Any acid or any mixture of acids may be employed in connection with the above process, although hydrochloric or sulphuric acids are preferred, and any soluble silicate or mixture of soluble silicates may be substituted for sodium silicate. All that is necessary is to regulate the concentrations and quantities so that the proper stability of the mixture is attained, or in other words, so that no precipitation will take place but the mixture will gradually set to a hydrogel. In order to accomplish this result, the mixture must be homogeneous and must be kept slightly acid in all its parts. This may be done either by adding the silicate solution to the acid solution with vigorous stirring, or by pouring the two solutions together uniformly while stirring vigorously. The final concentration of the acid in the resulting mixture should be from about 0.3 to 1.0 gram ions of hydrogen per liter, but a concentration of from 0.5 to 0.6 gram ions of hydrogen per liter is preferred.

According to said patent, the hydrogel after setting is broken into small pieces and washed free from excess acid and salts. The washed hydrogel is then dried in a stream of air at 75° to 120° C. After the hydrogel is nearly dry the temperature is slowly increased up to 300° to 400° C. An alternate method of drying described in the above patent is to take the material after the first heating at 75° to 120° C., as above described, and subject the same to a vacuum, the temperature during the vacuum treatment being from 75° to 120° C. The final product is a hard, glassy, porous gel which is so stable that it may be repeatedly activated by strong heating even to 600° C. without substantial diminution of its adsorptive powers.

A hydrogel which when dried by the methods above described will give a stable product having the proper pore characteristics, will also give a satisfactory product when dried according to the method of the present invention. It is important to observe, however, that unless a properly prepared hydrogel is used, the resulting product will be valueless no matter what method of drying is employed. Whether or not the manufacture has been properly conducted can be determined, in the last analysis, only by considering whether a satisfactory product has been obtained.

According to a method of drying formerly employed, the hydrogel is placed in trays in the form of small lumps, and the trays are placed in an oven. Heated air of gradually increasing temperature up to about 250° Fahrenheit is circulated over the trays, thereby drying the hydrogel. The air may be circulated in a closed path and heated by passing over steam pipes. With this process about ten hours are required to dry the hydrogel to a point where the water content is from 5% to 15% of the weight of the dry gel.

In the improved method of drying according to the present invention, the hydrogel in lump form is given a preliminary drying lasting about four hours in stationary trays in the manner above described. This preliminary drying removes from 50% to 90% of the water originally present in the hydrogel and leaves the gel containing water to the extent of about 60% of the weight of the dry gel. The gel is now sufficiently strong to withstand being tumbled about without injury that would prevent obtaining the desirable pore characteristics in the final product, the preservation of which, as above pointed out, is an essential object of the invention.

The next step consists in removing the partially dried hydrogel from the trays and placing it in a rotary cylindrical drier heated to a temperature not exceeding about 500° Fahrenheit. One passage through the rotary drier, which takes about ten minutes, is sufficient to reduce the water content to from 5% to 15% of the weight of the dry gel.

This reduction in the time required for drying the hydrogel increases the output of a plant from two to two and one-half times, resulting in a considerable economy in the cost of manufacture of the gel.

It is to be distinctly understood that the improved method of drying herein disclosed is not limited in its application to silica gel, although this has been described as a specific embodiment of the invention, but may be employed to obtain other gels of similar physical structure, such as gels of oxides of tin, aluminum, tungsten or titanium, either singly or in combination with each other, or gels of one or more of the above oxides with silica. It is also applicable in the manufacture of impregnated gels, that is to say, gels impregnated with catalytic agents such as metals and meal oxides, for example, nickel, iron or copper, or the oxides of these metals. Suitable methods of preparing these gels are described in detail in Patents 1,577,187 and 1,577,189.

Having thus described the invention, what is claimed as new and desired to be secured by Letters Patent is:

1. The method of drying hydrogel which consists in heating the hydrogel at a relatively low temperature while stationary until the water content of the hydrogen is reduced to such an extent that the hydrogel will withstand being tumbled about, and then heating at a considerably higher temperature while the hydrogel is being agitated until the water content is reduced to the desired amount.

2. The method of drying hydrogel which consists in passing air heated to a relatively low temperature over the stationary hydrogel until the water content of the hydrogel is reduced to such an extent that the hydrogel will withstand being tumbled about, and then heating at a considerably higher temperature while the hydrogel is being agitated until the water content is reduced to the desired amount.

3. The method of drying hydrogel which consists in heating the hydrogel at a relatively low temperature while stationary until the water content of the hydrogel is reduced to about 60% of the weight of the dry gel, and then heating at a considerably higher temperature while the hydrogel is being agitated until the water content is reduced below 15% of the weight of the dry gel.

4. The method of drying hydrogel which consists in passing air heated to a relatively low temperature over the stationary hydrogel until the water content of the hydrogel is reduced to about 60% of the weight of the dry gel, and then heating at a considerably higher temperature while the hydrogel is being agitated until the water content is reduced below 15% of the weight of the dry gel.

5. The method of drying hydrogel which consists in heating the hydrogel at a temperature not exceeding about 250° Fahrenheit while stationary until the water content of the hydrogel is reduced to such an extent that the hydrogel will withstand being tumbled about, and then heating at a higher temperature while the hydrogel is being agitated until the water content is reduced to the desired amount.

6. The method of drying hydrogel which consists in passing air heated to a temperature not exceeding about 250° Fahrenheit over the stationary hydrogel until the water content of the hydrogel is reduced to such an extent that the hydrogel will withstand being tumbled about, and then heating at a temperature of about 500° Fahrenheit while the hydrogel is being agitated until the water content is reduced to the desired amount.

7. The method of drying hydrogel which consists in heating the hydrogel at a temperature not exceeding about 250° Fahrenheit while stationary until the water content of the hydrogel is reduced to about 60% of the weight of the dry gel and then heating at a temperature of about 500° Fahrenheit while the hydrogel is being agitated until the water content is reduced below 15% of the weight of the dry gel.

8. The method of drying hydrogel which consists in passing air at progressively increasing temperatures up to about 250° Fahrenheit over the stationary hydrogel until the water content of the hydrogel is reduced to about 60% of the weight of the dry gel, and then heating at a temperature of about 500° Fahrenheit while the hydrogel is being agitated until the water content is reduced below 15% of the weight of the dry gel.

9. The method of drying hydrogel which consists in heating the stationary hydrogel at a temperature not exceeding about 250° Fahrenheit for about four hours, and then heating at a temperature of about 500° Fahrenheit for about ten minutes while the hydrogel is being agitated.

10. The method of drying hydrogel which consists in passing air at progressively increasing temperatures up to about 250° Fahrenheit over the stationary hydrogel for about four hours, and then heating at a temperature of about 500° Fahrenheit for about ten minutes while the hydrogel is being agitated.

11. The method of drying hydrogel which consists in subjecting the hydrogel in lump form while stationary to a gaseous medium heated to a relatively low temperature until the water content of the hydrogel is reduced to such an extent that the hydrogel will withstand being tumbled about, and then feeding the hydrogel through a gaseous medium heated to a considerably higher temperature until the water content is reduced to the desired amount.

12. The method of drying hydrogel which consists in subjecting the hydrogel in lump form while stationary to a gaseous medium heated to a relatively low temperature until the water content of the hydrogel is reduced to about 60% of the weight of the dry gel, and then feeding the hydrogel through a gaseous medium heated to a considerably higher temperature until the water content is reduced below 15% of the weight of the dry gel.

13. The method of drying hydrogel which consists in subjecting the hydrogel in lump form while stationary to a gaseous medium heated to a temperature not exceeding about 250° Fahrenheit until the water content of the hydrogel is reduced to such an extent that the hydrogel will withstand being tumbled about, and then feeding the hydrogel through a gaseous medium heated to a temperature of about 500° Fahrenheit until the water content is reduced to the desired amount.

14. The method of drying hydrogel which consists in subjecting the hydrogel in lump form while stationary to a gaseous medium heated to a temperature not exceeding about 250° Fahrenheit until the water content of the hydrogel is reduced to about 60% of the weight of the dry gel, and then feeding the hydrogel through a gaseous medium heated to a temperature of about 500° Fahrenheit until the water content is reduced below 15% of the weight of the dry gel.

15. The method of drying hydrogel which consists in subjecting the hydrogel in lump form while stationary to a gaseous medium heated to a temperature not exceeding about 250° Fahrenheit for about four hours, and then feeding the hydrogel through a gaseous medium heated to a temperature of about 500° Fahrenheit for about ten minutes.

In testimony whereof I hereunto affix my signature.

ERNEST BALDWIN MILLER.